(12) United States Patent
Ishikawa (10) Patent No.: US 7,194,900 B2
(45) Date of Patent: Mar. 27, 2007

(54) COLLISION REACTION FORCE MEASUREMENT APPARATUS

(75) Inventor: Shigeo Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/022,767

(22) Filed: Dec. 28, 2004

(65) Prior Publication Data

US 2006/0070431 A1  Apr. 6, 2006

(30) Foreign Application Priority Data

Sep. 27, 2004 (JP) .............................. 2004-280050

(51) Int. Cl.
*G01L 5/28* (2006.01)
(52) U.S. Cl. ........................................................ 73/126
(58) Field of Classification Search .................... 73/126
See application file for complete search history.

(56) References Cited

U.S. PATENT DOCUMENTS

| | | | | |
|---|---|---|---|---|
| 4,840,377 A * | 6/1989 | Bowser et al. | ............... | 473/467 |
| 4,856,318 A * | 8/1989 | Hogan et al. | ............... | 73/12.13 |
| 4,928,959 A * | 5/1990 | Bassett et al. | ................ | 482/79 |
| 5,336,959 A * | 8/1994 | Park et al. | ................... | 310/328 |
| 5,377,996 A * | 1/1995 | Shure | .......................... | 273/330 |
| 5,490,411 A * | 2/1996 | Hogan | ........................ | 73/12.13 |
| 5,982,573 A * | 11/1999 | Henze | .......................... | 360/75 |
| 6,196,932 B1 * | 3/2001 | Marsh et al. | ............... | 473/223 |
| 6,367,800 B1 * | 4/2002 | Sheck et al. | ................. | 273/372 |
| 6,412,332 B1 * | 7/2002 | Bartonek | .................... | 73/12.01 |
| 6,477,447 B1 * | 11/2002 | Lin | ............................. | 700/301 |
| 6,668,661 B2 * | 12/2003 | Rider | ........................... | 73/762 |
| 6,892,564 B2 * | 5/2005 | Ishikawa | ................... | 73/12.06 |
| 6,917,837 B2 * | 7/2005 | Hashimoto et al. | ........... | 700/20 |
| 6,940,407 B2 * | 9/2005 | Miranda-Knapp et al. | ....................... | 340/572.1 |

FOREIGN PATENT DOCUMENTS

JP    3404291    2/2003

* cited by examiner

*Primary Examiner*—Michael Cygan
*Assistant Examiner*—Octavia Davis
(74) *Attorney, Agent, or Firm*—Staas & Halsey LLP (57) ABSTRACT

A collision reaction force measurement apparatus has a collision surface receiving a collision of a portable electronic device and a measurement part measuring a collision reaction force occurring when the portable electronic device makes the collision against the collision surface, wherein the collision surface comprises a plurality of collision surface elements and the measurement part comprises a plurality of measurement part elements provided for the plurality of collision surface elements, respectively.

9 Claims, 10 Drawing Sheets

TO BRIDGE CIRCUIT

FIG.11

COLLISION REACTION FORCE MEASUREMENT APPARATUS

BACKGROUND OF THE INVENTION

1. Field of the Invention

The present invention relates to a collision reaction force measurement apparatus, and, in particular, a collision reaction force measurement apparatus for measuring a collision reaction force applied to a portable electronic device or such when it drops.

2. Description of the Related Art

For example, for a so-called portable electronic device such as a cellular phone, a notebook-type personal computer or such, in addition to miniaturization and reduction of a product weight, enhancement of various functions has been achieved, and simultaneously, it is demanded that such a product should have a sufficient mechanical strength against a dropping impact —which must be presumed, in consideration of how it is used. As a method of evaluating a mechanical strength of a product against a dropping impact, a collision reaction force measurement apparatus may be used. Unlike another measurement method in which the measurement is carried out with an acceleration sensor or a strain gage directly attached to the product itself, the method of using the collision reaction force measurement apparatus is advantageous in that, since a sensor cable or such which may affect an actual dropping position of the measurement target object is not required, it is possible to carry out highly reproducible evaluations.

Figure 1:
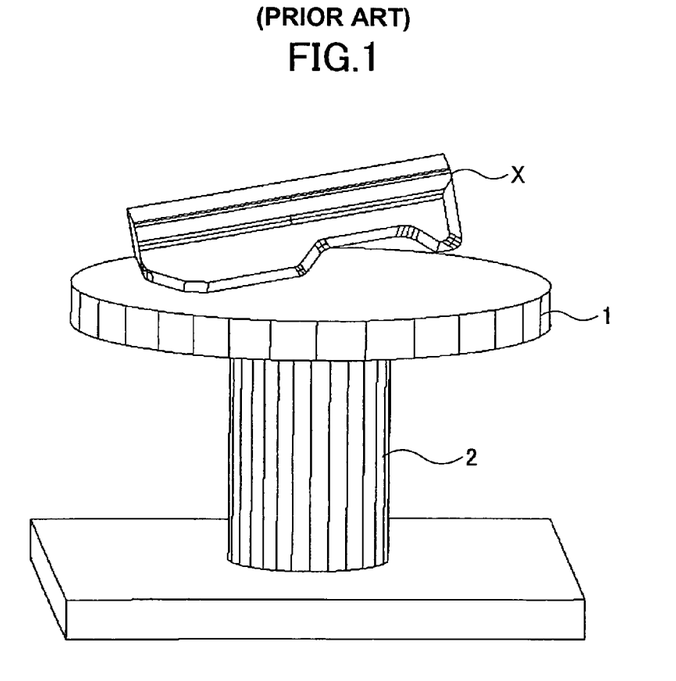
FIG. 1 shows a perspective view of a collision reaction force measurement apparatus in one example of the related art.

As a specific example of the collision reaction force measurement apparatus, a configuration shown in FIG. 1 may be considered. In this configuration, a collision table 1 is provided on a load cell 2, a measurement target object 3 is made to drop on the collision table 1, and then, a collision reaction force thus occurring is measured by the load cell 2. However, in the collision reaction force measurement apparatus having the configuration shown in FIG. 1, if the measurement target object collides at a position deviated from a center of the load cell 2, a relevant impact is applied to the load cell 2 in a form of a torque, and as a result, it may be difficult to accurately measure the collision reaction force.

Figure 2:
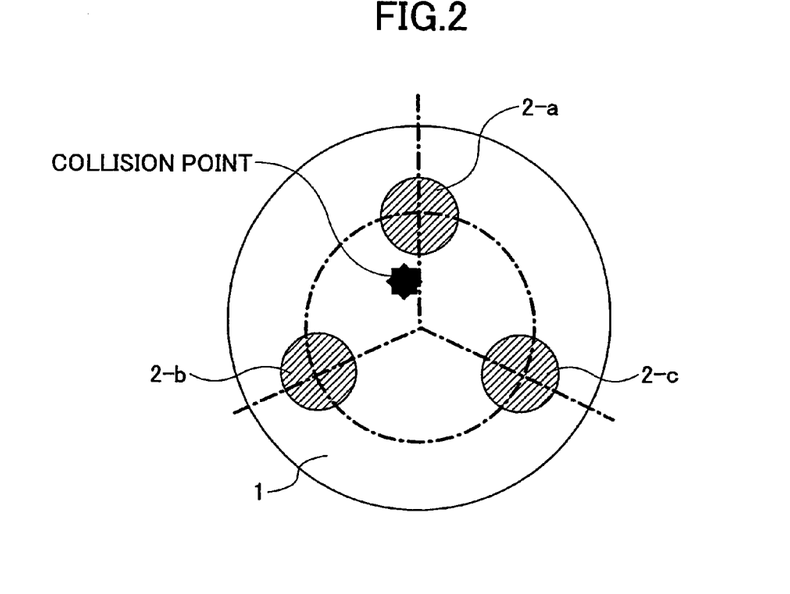
FIG. 2 shows a plan view of a collision reaction force measurement apparatus in another example of the related art.

Japanese Patent No. 3404291 discloses a method for solving this problem for example in which three load cells 2-a, 2-b and 2-c arranged at vertexes of a triangle are provided, and then, as a result of combining measurement outputs of the respective ones of the load cells 2-a, 2-b and 2-c, a collision reaction force of a measurement target object X is obtained finally.

SUMMARY OF THE INVENTION

However, in the collision reaction force measurement apparatus shown in FIG. 2 configured by the combination of the collision table 1 and the load cell 2, as mentioned above, an accurate measurement result may not be expected unless the measurement target object X drops and collides at the center of the collision table 1. On the other hand, upon treating a portable electronic device for which an appearance design is sought as a result of freely curved surfaces being used in various ways, it may be difficult to achieve a measurement condition fulfilling such a requirement that the measurement target object should be made to drop and collide at the center of the collision table. Furthermore, when a configuration in which, as shown in FIG. 2, the three load cells 2-a, 2-b and 2-c supporting the collision table 1 are used, the following problem may occur.

Figure 3A:
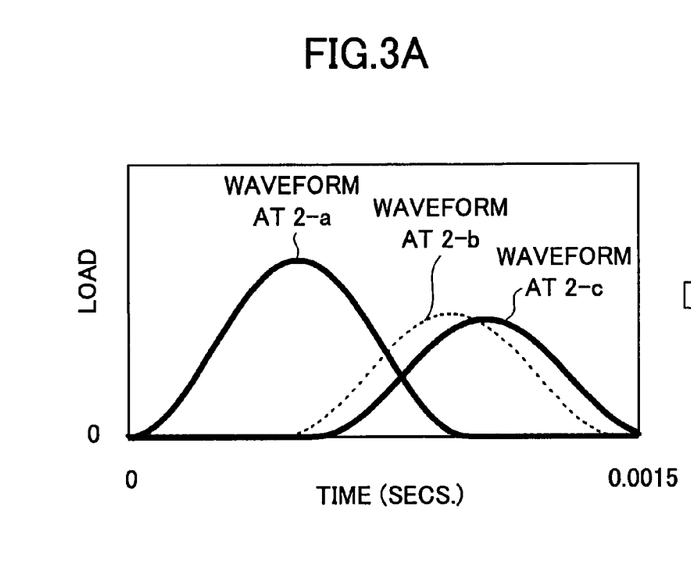
FIGS. 3A and 3B illustrate a problem which may occur in the related art shown in FIG. 2.
Figure 3B:
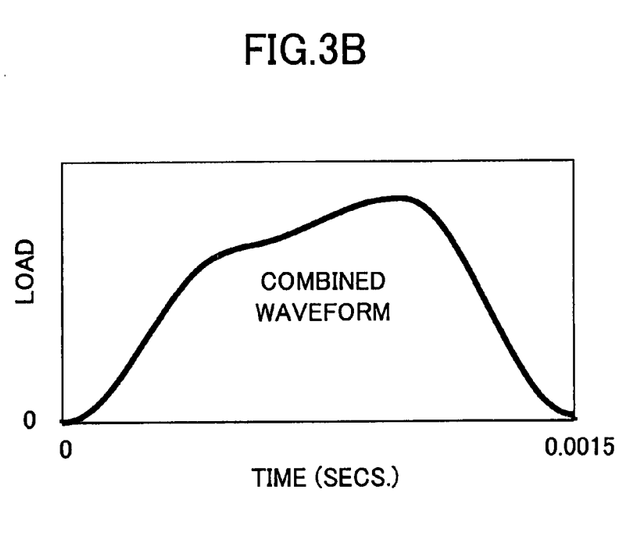

That is, for example, when a measurement target object such as a cellular phone is made to drop from a height of 1.5 m, a collision reaction force has a high frequency (approximately 1 kHz). Therefore, if the measurement target object collides at a position deviated from the center of the collision table as shown in FIG. 2, a time interval required until each load cell 2 reacts to the collision may become different among the respective load cells 2-a, 2-b and 2-c according to distances between the actual collision point and locations of the respective load cells 2. Thereby, measured waveforms obtained by the respective load cells 2-a, 2-b and 2-c may have phase difference thereamong, as shown in FIG. 3A. If these waveforms shown are combined as they are, a waveform shown in FIG. 3B is obtained. This waveform may not accurately express an actual collision reaction force due to the phase difference mentioned above.

Further, when such a collision reaction force measurement apparatus in the related art is used, even though it may be possible to evaluate a force applied to the measurement target object when the measurement target object collides, it is difficult to evaluate as to which position of the measurement target object the force is actually applied at.

According to the present invention, in order to solve the above-mentioned problems, a collision surface receiving a collision of a measurement target object and a measurement part measuring a collision reaction force occurring when the predetermined object collides against the collision surface are provided. The collision surface includes a plurality of collision surface elements, and also, the measurement part includes a plurality of measurement part elements provided for the plurality of collision surface elements, respectively.

As a result of configuring the collision reaction force measurement apparatus as mentioned above, it is possible to accurately measure a collision reaction force applied when the measurement target drops on the collision surface, even when the measurement target object drops at any position thereof. Furthermore, since the collision reaction force applied at the time of collision of the measurement target object can be measured by the plurality of measurement part elements, it is possible to evaluate a spatial distribution of the collision reaction force applied.

That is, in the related art described above with reference to FIG. 1, since the single load cell is used to carry out the measurement, a collision force acts as a torque to the load cell when the measurement target object collides at a position separate from the center of the load cell. As a result, accurate measurement of collision reaction force cannot be achieved in the related art. Further, even when the method described above with reference to FIG. 2 is applied in which the three or more load cells are disposed along a circumference and a final measurement value is obtained from combining the respective measurement values of these load cells, measurement accuracy may degrade due to difference in the transmission time of the collision reaction force required for the respective load cells from the actual collision point.

In contrast thereto, according to the present invention, the collision surface is finely divided into the respective collision surface elements, and also, the measurement part elements are allocated for the respective ones of the collision surface elements in a one-to-one corresponding manner. Thereby, it is possible to achieve accurate measurement when a measurement target object drops at any position on the collision surface.

Furthermore, according to the related art, the collision reaction force is obtained from the measurement value of the single load cell or a combination of measurement values of the plurality of load cells. Therefore, it is not possible to evaluate a distribution of a force actually applied to the measurement target object. In contract thereto, according to the present invention, collision impact applied by the measurement target object may be received by the many measurement part elements. Then, as a result of the measurement values of the respective ones of the measurement part elements being used separately, it is possible to obtain a two-dimensional distribution of the collision reaction force concerning the collision surface, and thereby, it is possible to carry out effective evaluation as to how much the collision reaction force occurs at each part of the measurement target object.

Other objects and further features of the present invention will become more apparent from the following detailed description when read in conjunction with the accompanying drawings:

DETAILED DESCRIPTION OF THE PREFERRED EMBODIMENTS

Respective embodiments of the present invention are described with reference to figures below.

A first embodiment of the present invention is described now.

A collision reaction force measurement apparatus according to the first embodiment of the present invention includes a collision reaction force detection part 10 directly receiving collision of a measurement target object X; and a collision reaction force processing part 20 carrying out data processing on measurement values obtained from the collision reaction force detection part 10.

Figure 4A:
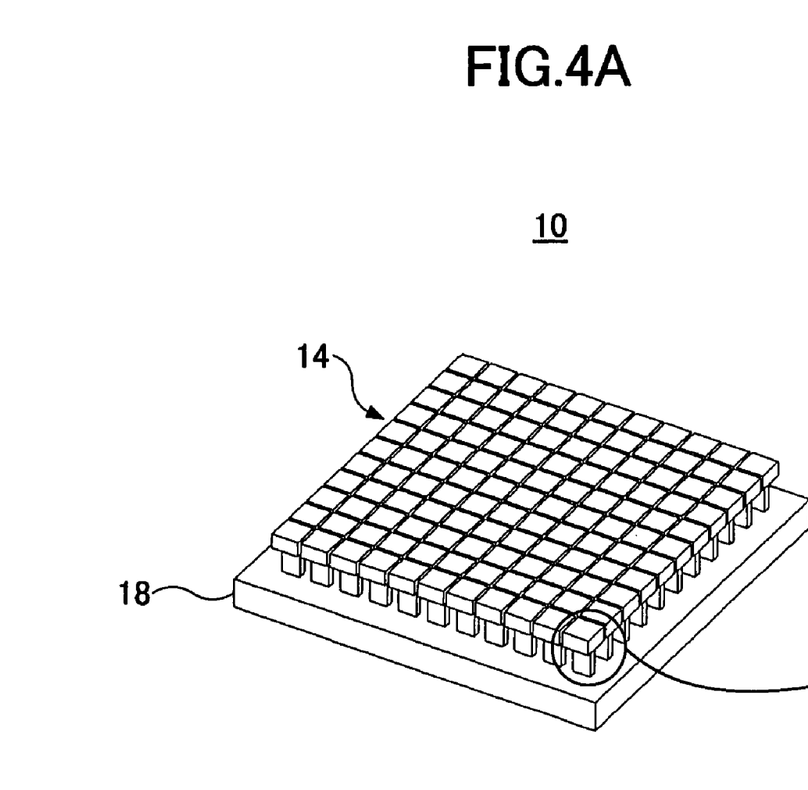
FIG. 4A shows a perspective view of a collision reaction force detection part of a collision reaction force measurement apparatus according to a first embodiment of the present invention.
Figure 4B:
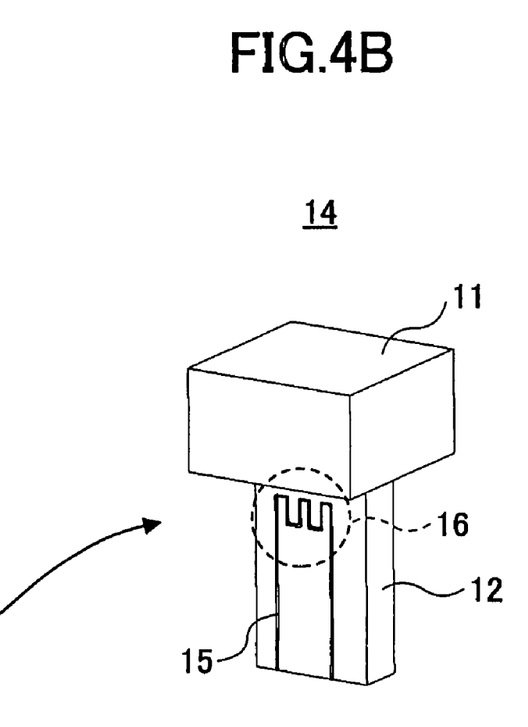
FIG. 4B shows a perspective view of a load cell included in the collision reaction force detection part shown in FIG. 4A.

FIG. 4A shows a perspective view of the collision reaction force detection part 10 included in the collision reaction force measurement apparatus according to the first embodiment of the present invention. FIG. 4B shows a magnified perspective view of a load detection part 14. The load detection part 14 is one element of the collision reaction force detection part 10 shown in FIG. 4A, and is made of a combination of a collision table 11 and a load cell 12. The collision table 11 acts as a collision surface element which is an element of a collision surface of the collision reaction force detection part 10, which surface is provided for directly receiving collision of the measurement target object X. The load cell 12 acts as a measurement part element which is an element of a measurement part measuring a collision reaction force occurring in the measurement target object X when the measurement target object X collides against the collision surface made of the collision surface elements (i.e., the collision tables 11).

As shown, the collision reaction force detection part 10 has a configuration in which the load detection parts 14, each of which is made of the combination of the collision table 11 and the load cell 12 as mentioned above, are arranged like a grid or a matrix on a pedestal part 18. In other words, the collision reaction force detection part 10 has a configuration in which the load detection parts 14 each having the configuration shown in FIG. 4B made of the combination of the collision table 11 and the load cell 12 are placed on the pedestal part 18 at equal intervals vertically and horizontally as shown in FIG. 4A.

The load cell 12 of each load detection part 14 has a configuration, as shown in FIG. 4B, in which an electric conductive pattern 15 having a predetermined shape made of an electric conductive material such as copper is produced on a side wall of a base member shaped in a rectangular column of a metal plate made of stainless steal or such, as shown. The electric conductive pattern 15 is produced integrally with the base member with the use of integral molding technology or such. A predetermined part of this base member acts as a measurement part 16 as shown. This part 16 may be deformed in response to a impact load applied thereto due to collision of the measurement target object X against the collision table 12 which is supported by the load cell 12. As a result, a length of the electric conductive pattern 15 integrally produced on the base member at this part 16 changes accordingly. Then, this change in the length of the electric conductive pattern 15 is measured in a form of change in a resistance value of the electric conductive pattern 15.

In this case, a commercially available strain gauge or such may be attached to the base member made of the metal plate, instead of the electric conductive pattern 15 produced on the base member as mentioned above. Further, a base metal of the collision table 11 and the load cell 12 of each load detection part 14 should be material having sufficiently high rigidity. Furthermore, each load detection part 14 is miniaturized sufficiently so that it has a natural frequency sufficiently higher than a frequency of a collision reaction force to be measured therewith.

The collision table 11 of each load detection part 14 has a rectangular parallelepiped shape having a square-shaped top side as shown.

Figure 5:
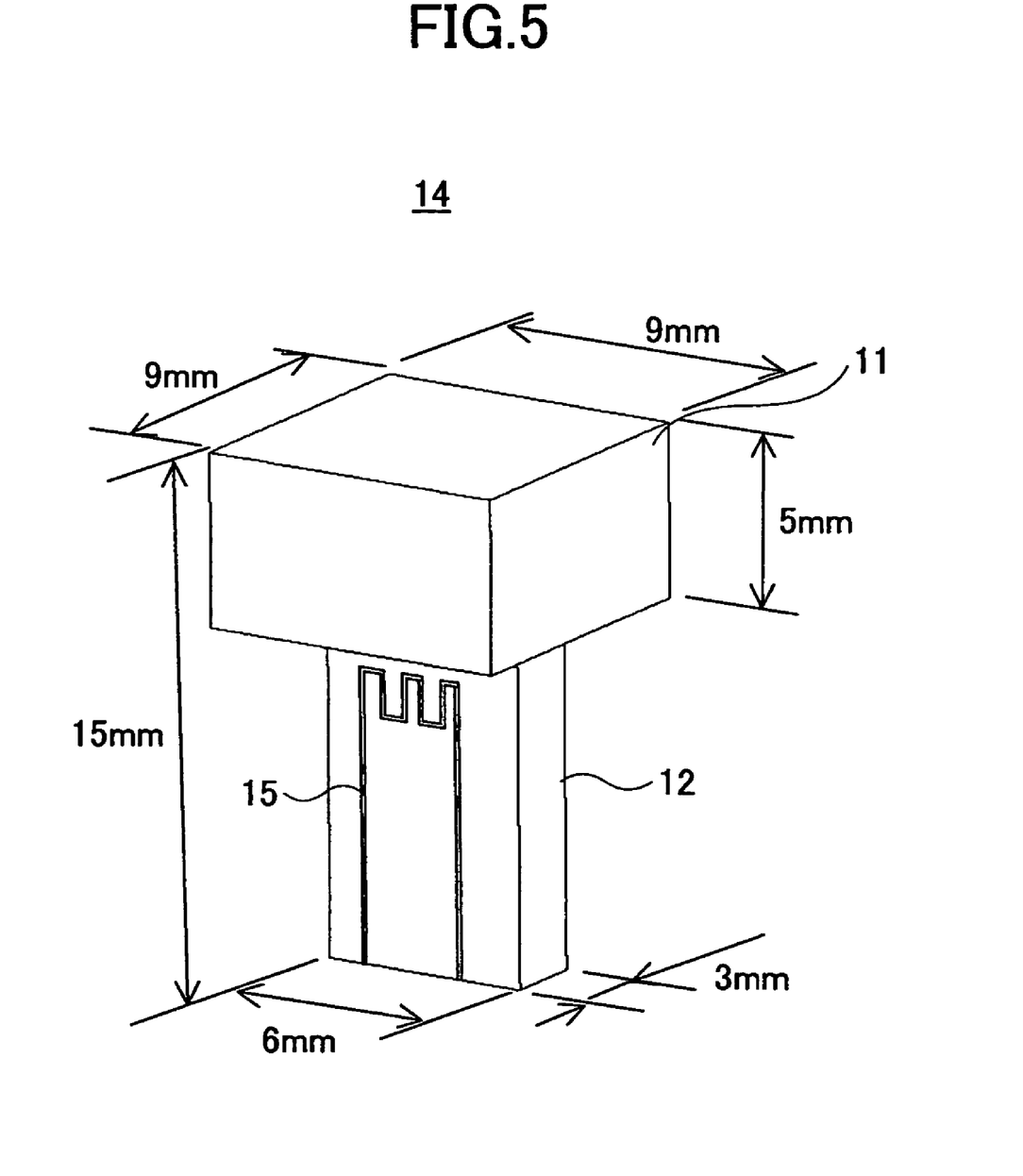
FIG. 5 shows a magnified perspective view of the load cell shown in FIG. 4B.

FIG. 5 shows a specific dimension example of each load detection part 14 included in the collision reaction force detection part 10 of the collision reaction force measurement apparatus according to the first embodiment of the present invention. As shown, one side of the square of the top side of the collision table 11 has 9 mm; and a height/thickness of the collision table 11 is 5 mm. Further, the entirety of the load detection part 14 including the collision table 11 and the load cell 12 has a height of 15 mm. Further, a long side of a rectangle of a bottom surface of the load cell 12 having the shape of the rectangular column has 6 mm; and a short side of the same rectangle has 3 mm, as shown.

When the above-described sizes are applied, and SUS304 stainless steel is applied as the material of the base member, the minimum natural frequency value of the base member in the load detecting direction becomes approximately 50 kHz. Further, when a cellular phone, as an example of the measurement target object, is made to drop from a height of 1.5 m, a frequency of an impact waveform occurring thereby is approximately 1 kHz. Accordingly, no resonance should occur when the measurement target object collides against the load cell 12, and thus, accurate measurement can be achieved therewith.

Furthermore, a yield stress of SUS304 stainless steel is $206 \times 10^6$ Pa. As a result, no plastic deformation should occur in the load detection part 14 unless a load exceeding 3708 N ($=206 \times 10^6$ [Pa]$\times 3.0 \times 10^{-3}$ [m]$\times 6.0 \times 10^{-3}$ [m]) corresponding to the above-mentioned yield stress is applied to the collision table 11 of the load detection part 14 having the dimension shown in FIG. 5. Specifically, even when a cellular phone having a weight of approximately 100 g, for example, collides against the collision detection part 14 with collision acceleration more than 3700 G, the impact thus applied can be received by the single load detection part 14 safely.

Figure 6:
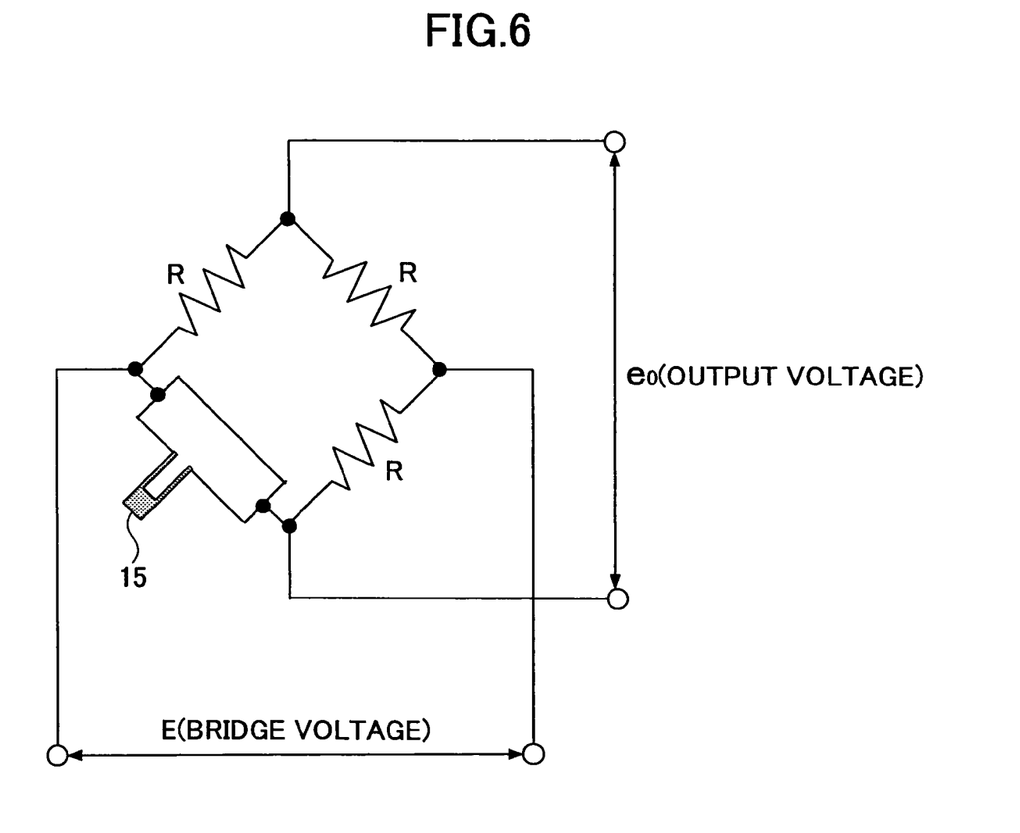
FIG. 6 shows a circuit diagram for illustrating principle of collision reaction force measurement applied in the collision reaction force measurement apparatus according to the first embodiment of the present invention.
Figure 7:
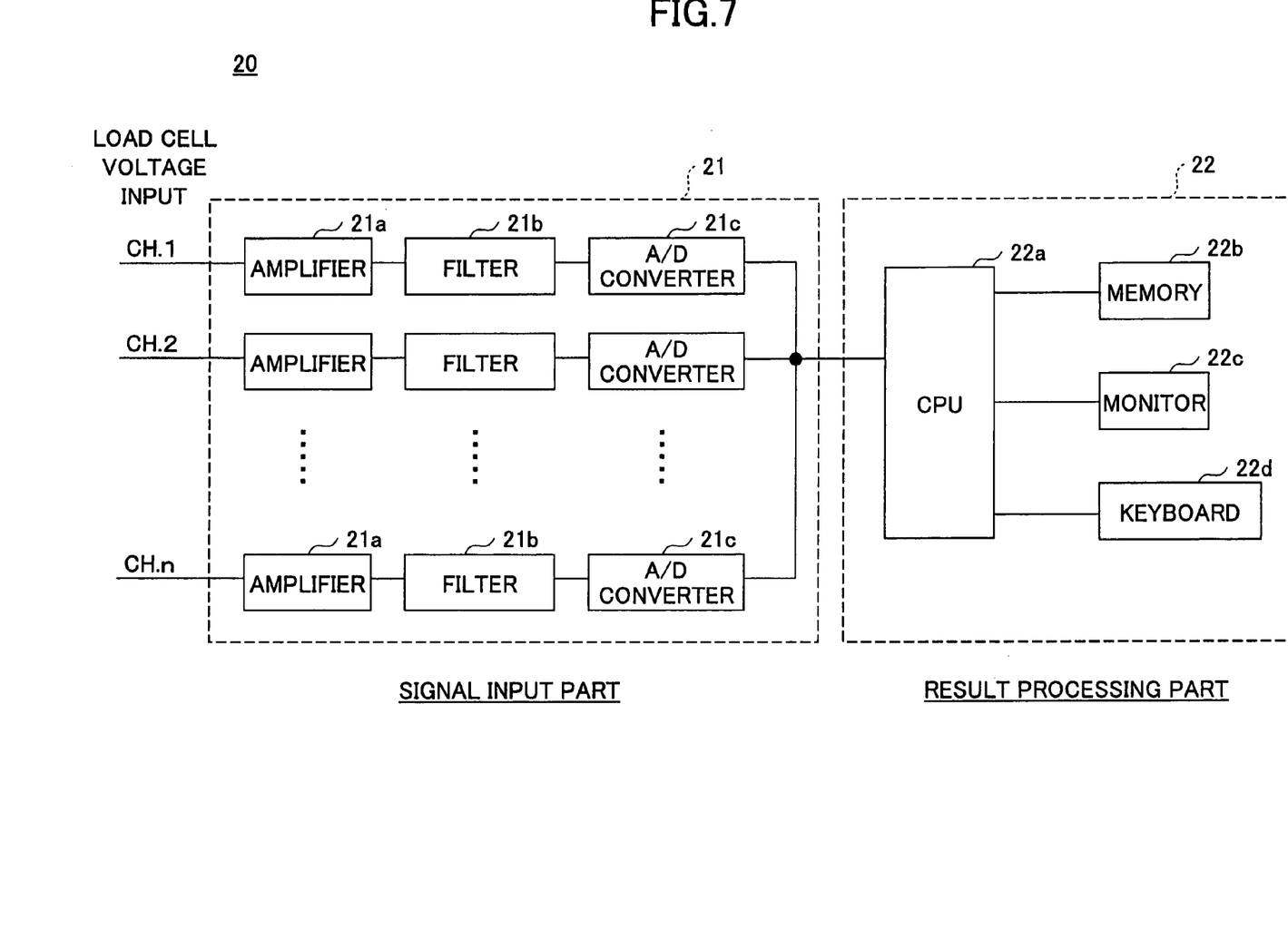
FIG. 7 shows a block diagram of a collision reaction force processing part of the collision reaction force measurement apparatus according to the first embodiment of the present invention.

FIG. 6 shows an example of a bridge circuit for detecting electric resistance change in the electric conductive pattern 15 for measuring strain, in a form of an output voltage of the circuit. FIG. 7 shows a block diagram of the collision reaction force processing part 20 of the collision reaction force measurement apparatus in the first embodiment of the present invention.

As shown in FIG. 6, in the bridge circuit, the electric conductive pattern 15 for measuring strain of the load cell 12 of each load detection part 14 is connected with three resistors R in a bridge manner, and a bridge voltage E is applied between one end of the electric conductive pattern 15 and an oppositely located connection point between the resistors R. Then, a voltage $e_0$ between the other end of the electric conductive pattern 15 and an oppositely located connection point between the resistors R is taken as the output voltage (representing the collision impact force, i.e., the collision reaction force) of the bridge circuit. These resistors R included in the bridge circuit are provided inside of the pedestal part 18 shown in FIG. 4A.

The collision reaction force processing part 20 shown in FIG. 7 includes a signal input part 21 receiving the output voltage of the bridge circuit for each of the load detection parts 14 shown in FIG. 6; and a personal computer 22 receiving outputs of the signal input part 21 and carrying out predetermined operation processing thereon so as to output operation results.

The signal input part 21 includes amplifiers 21*a* which receive the output signals $e_0$ from the respective ones of the load cells 12 and amplify them separately; filters 21*b* carrying out filtering operation on the signals thus amplified; and A/D converters 21*c* converting the signals having undergone the filtering operation into digital signals. The number of channels each including the amplifier 21*a*, the filter 21*b* and the A/D converter 21*c* corresponds to the number of the load cells 12 included in the collision reaction force detection part 10, and the output signal of each load cell 12 is processed by the relevant amplifier 21*a*, filter 21*b* and A/D converter 21*c*, separately. Although not shown, the signal input part 21 further includes a voltage applying part for providing the bridge voltage E to the bridge circuit of each load cell 12 shown in FIG. 6.

The personal computer 22 includes a CPU 22*a* processing the output signals from the signal input part 21, a monitor 22*c* and a keyboard 22*d*. The CPU 22*a* receives the output signals for the respective ones of the load cells 12 separately, and may process them separately, in such a manner that the respective output signals are regarded as separate values. The memory 22*b* includes a RAM, a ROM or such, and is used for storing therein an operation program used for carrying out the predetermined operation on the signals received from the signal input part 21, operation values intermediately obtained during the operation, and operation results. The monitor 22*c* may be used for displaying thereon a two-dimensional distribution of collision reaction force values for the respective load cells 12 as the operation results, as will be described later. The keyboard 22*d* is used for inputting instructions to control operation of the personal computer 22 by an operator.

Operation in the collision reaction force measurement apparatus according to the first embodiment configured as described above is described next.

When the load cell 12 of each load detection part 14 is deformed in response to impact applied due to collision of the measurement target object against the collision table 11, the electric resistance of the electric conductive pattern 15 for measuring strain changes accordingly. That is, the measurement part 16 of the load cell 12 shown in FIG. 4B is deformed due to the load thus applied thereto, and this deformation of the load cell 12 results in deformation of the electric conductive pattern 15 accordingly. In response thereto, the electric resistance of the electric conductive pattern 15 changes. As a result, the voltage across the electric conductive pattern 15 shown in FIG. 6 changes. The signal of the voltage change is then input to the signal input part 21 from the bridge circuit including the three resistors R shown in FIG. 6. Then, the input signal is amplified by the relevant amplifier (dynamic strain amplifier) 21*a*, undergoes filtering in the filter 21*b*, is converted into the digital signal in the A/D converter 21*c*, and then, is input to the personal computer, for each load cell 12.

In the personal computer 22, the voltage value thus input for each load cell 12 is multiplied with a predetermined coefficient, and thereby, it is transformed into a collision reaction force value. Then, the personal computer 22 carries out various operations so that collision reaction force waveforms obtained from the respective load cells 12 are combined, and thus, a final reaction force waveform corresponding to the collision occurring when the measurement target object collides against the collision surface made of the plurality of collision tables 11 is obtained with a high accuracy. Unlike the case of the related art described above with reference to FIGS. 2, 3A and 3B, the collision surface according to the first embodiment of the present invention includes the plurality of separate collision tables 11, and, as a result, when particular parts of the measurement target object collide against some of the collision tables 11, respectively, impact forces applied there are transmitted to their own load cells 12 without time delay, respectively. As a result, even when the measurement target object collides against the collision surface at any position, no substantial time delay occurs until the impact force is actually detected by each particular load cell 12. Accordingly, no substantial phase difference occurs among the respective measurement waveforms thus obtained. As a result, when these measurement waveforms are combined, it is possible to obtain an accurate measurement value of the collision reaction force applied to the entirety of the measurement target object X.

Figure 8:
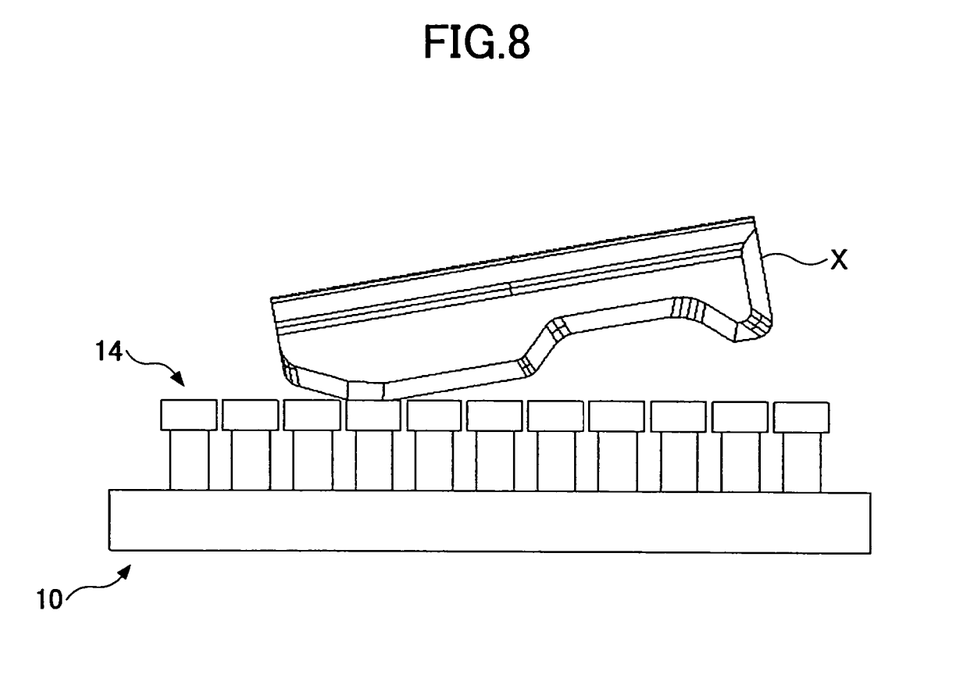
FIG. 8 illustrates an example of a state in which a measurement target object actually collides against the collision reaction force detection part shown in FIG. 4A.
Figure 9:
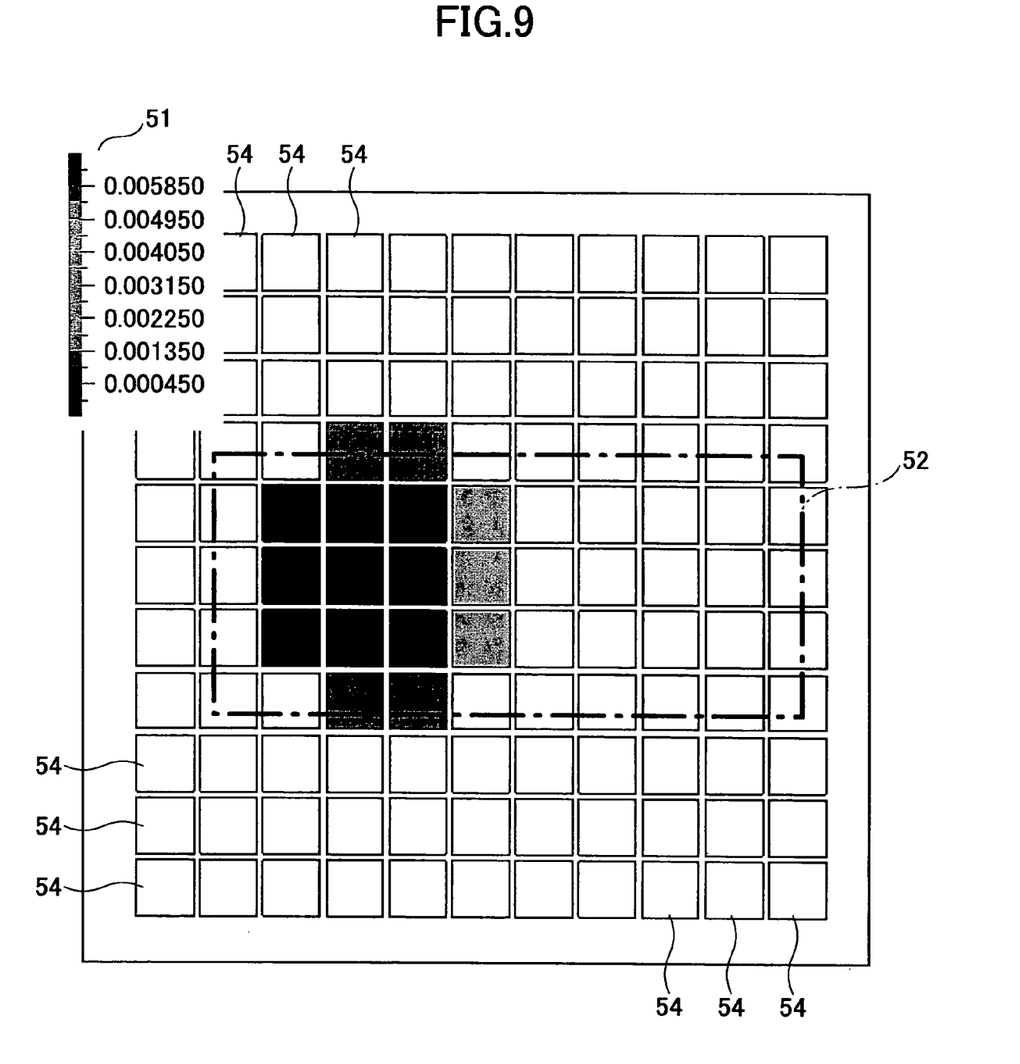
FIG. 9 shows an example of a manner of display carried out by the collision reaction force processing part, corresponding to the collision state shown in FIG. 8.

Other than combining the measurement waveforms from the respective load cells 12 as mentioned above, it is also possible to process these waveforms separately. For example, it is possible to provide a configuration in the collision reaction force measurement apparatus according to the first embodiment such that, when the measurement target object X collides against the collision reaction force detection part 10 in a way as shown in FIG. 8, an image such as that shown in FIG. 9 is displayed on the monitor 22c of the personal computer 22. In FIG. 9, each small square 54 represents the respective one of the load cells 12 included in the collision reaction force detection part 10. A color applied to each square 54 is controlled according to the magnitude of the collision impact actually applied to the relevant load cell 12. Thus, it is possible to express the magnitude of the collision impact applied to each load cell 12 in a form of the color applied thereto in the image displayed on the monitor 22c.

A color bar 51 may also be displayed on the monitor 22c as shown in FIG. 9 together simultaneously. The color bar 51 includes a row of various color samples which correspond to the colors which may be applied to the respective squares 54 shown in FIG. 9 as mentioned above, representing possible variation of the collision reaction force (corresponding to the collision impact force applied to each load cell 12) accompanied by corresponding specific numeric values of the load, as shown. As a result, a viewer can easily recognize which color represents a specific numeric value of the collision reaction force. Furthermore, an outline 52 (indicated by a solid, alternate long and short dash line) of the measurement target object X may be also displayed on the image in a superimposing manner as shown in FIG. 9. As a result, it becomes possible to carry out spatial evaluation of the magnitudes of the collision reaction forces occurring at particular parts/positions of the measurement target object X. In this case, information required for determining a specific position of the measurement target object X, so as to determine a position at which the outline 52 of the measurement target object X should be displayed on the image of the monitor 22c as shown in FIG. 9 may be obtained from, for example, a scene at the moment of the actual collision of the measurement target object X against the collision surface of the collision reaction force detection part 10 photographed by a camera which may be provided as an accessory of the collision reaction force measurement apparatus in the first embodiment of the present invention.

A second embodiment of the present invention is described next.

Figure 10A:
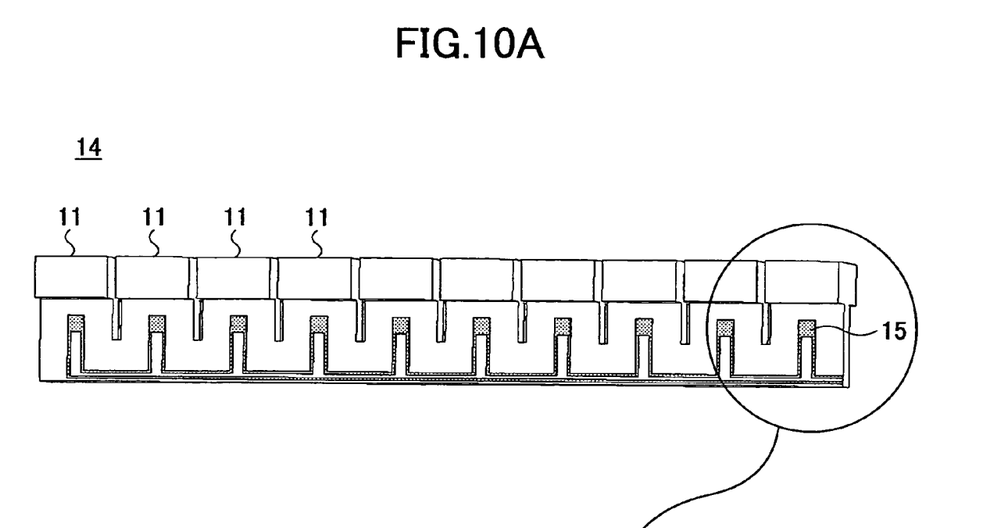
FIG. 10A shows a perspective view of one line of load cells included in a collision reaction force detection part of a collision reaction force measurement apparatus according to a second embodiment of the present invention.
Figure 10B:
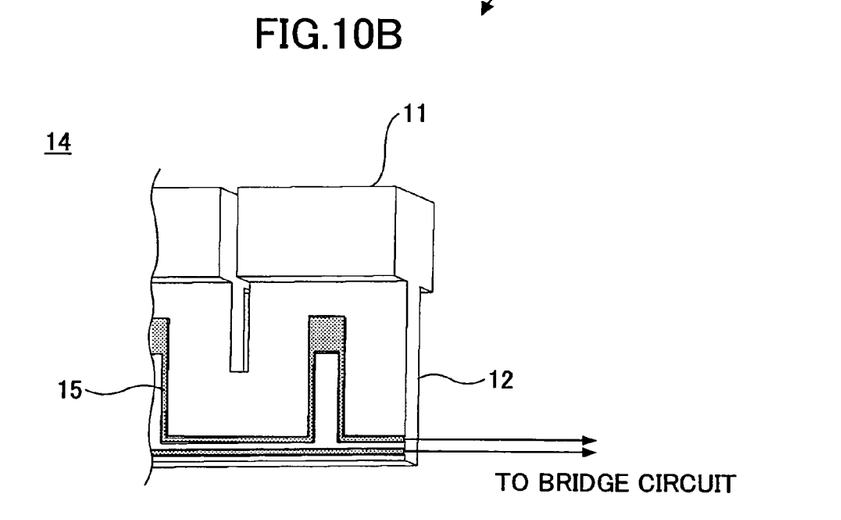
FIG. 10B shows a partial magnified view of the load cells shown in FIG. 10A.

FIG. 10A shows a configuration of a collision reaction force detection part 10 included in a collision reaction force measurement apparatus according to the second embodiment of the present invention. It is noted that FIG. 10A shows a perspective view of only one line of load detection parts 14 extracted from those included in the collision reaction force detection part 10 according to the second embodiment. FIG. 10B shows a magnified perspective view of some particular load detection parts 14 included in the line of the load detection parts 14 shown in FIG. 10A.

As shown in FIG. 10A, in the collision reaction force measurement apparatus according to the second embodiment, from among the many load detection parts 14 placed like a grid as shown in FIG. 4A, some of load detection parts 14 arranged in a line corresponding to each column or each row of the grid or matrix are manufactured integrally according to an integrally moldering technology or such. Furthermore, as shown in FIG. 10A, the strain measurement patterns (electric conductive patterns) 15 provided on the load cells 12 of the respective load detection parts 14 are connected mutually into a single continuous pattern 15 collectively, through the corresponding one line of the plurality of load detection parts 14 manufactured integrally as mentioned above, i.e., for each row or each column of the grid or matrix of the load detection parts 14. Specifically, when the total 121 load detection parts 14 are provided (11 rows×11 columns) as shown in FIG. 4A, each eleven load detection parts 14 for each row or each column are manufactured integrally, and, as a result, total 14 lines of the load detection parts 14, each line of which are manufactured integrally, are manufactured accordingly.

Figure 11:
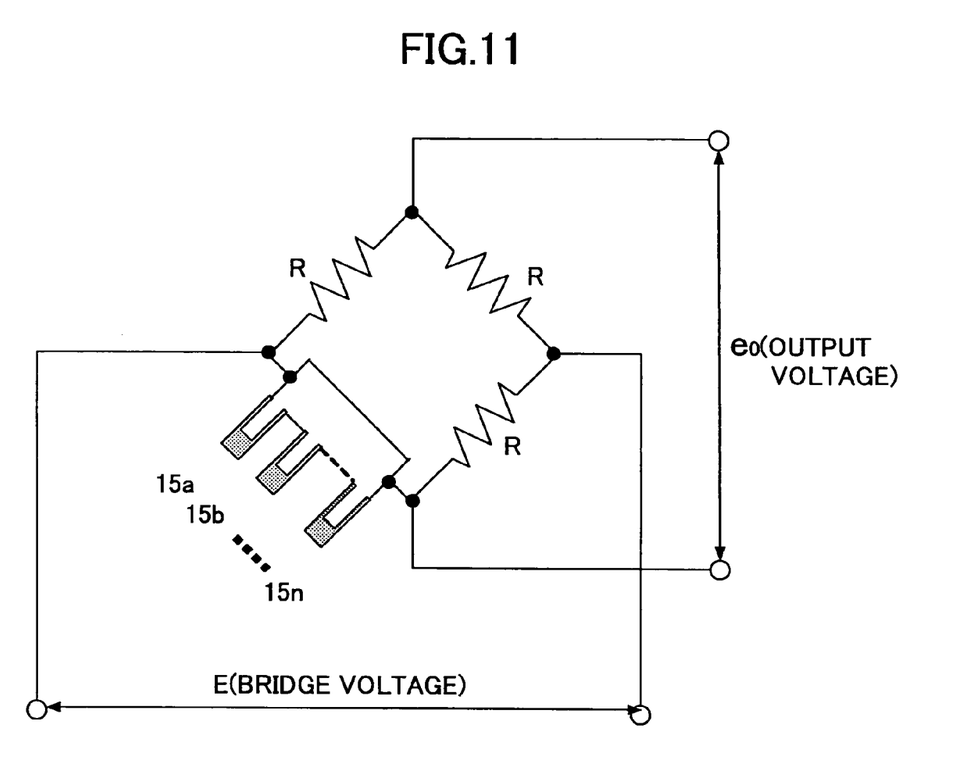
FIG. 11 shows a circuit diagram for illustrating principle of collision reaction force measurement applied in the collision reaction force measurement apparatus according to the second embodiment of the present invention.

FIG. 11 shows a configuration of the bridge circuit applicable to the above-described second embodiment. As shown, a single bridge circuit is provided for each line of respective strain measurement patterns 15 (15a, 15b, 15c, . . . , 15n) corresponding to each row or column of the load detection parts 14 integrally manufactured as mentioned above. As a result, in the above-mentioned example of 11 rows by 11 columns, the total 11 bridge circuits should be provided for the 121 load detection parts 14. Similarly, as to the collision reaction force processing part 20 shown in FIG. 7, the signal input part 21 should have only total 11 channels (each channel including the amplifier 21a, the filter 21b and the A/D converter 21c) (n=11 in FIG. 7) for the 121 load detection parts 14 according to the second embodiment while the total 121 channels are required for the first embodiment in this example.

Specifically, according to the second embodiment, each line of the load detection parts 14 in the collision reaction force detection part 10 are integrally molded according to a manner of etching working. Generally speaking, since a change in an electric resistance value occurring due to deformation of the strain measurement pattern 15 made by copper or such is very small, a high-accuracy amplifier (i.e., the amplifier 21a in FIG. 7) is required to detect it accurately. Therefore, according to the first embodiment, when the amplifier is provided for each load cell 12 in one-to-one correspondence, the cost may increase accordingly. In contrast thereto, according to the second embodiment as shown in FIG. 10A, in which only one amplifier is required for processing the signals obtained from the load cells 12 belonging to each line (i.e., each row or column of the grid of the load detection parts 14), it is possible to effectively reduce the finally required cost. Furthermore, since the etching working technology is applied for molding the load detection parts 14, it is possible to easily obtain even characteristics/property throughout the plurality of load cells 12.

Embodiments of the present invention are not limited to those described above. For example, in the configuration according to the first embodiment shown in FIG. 4A, it is possible to integrally mold each particular load detecting part 14 shown in FIG. 4B also including the collision table 11. In other words, it is possible to integrally mold the collision table 11 and the load cell 12 together. Alternatively, in the configuration of the first embodiment shown in FIG. 4A, only the strain measurement patterns 15 may be connected together for each line (each row or each column) of the load detection parts 14 into a single continuous pattern collectively. In this case, for each line (row or column), only a single bridge circuit should be provided as shown in FIG. 11, and thus, the same as in the second embodiment, it is possible to effectively reduce the required number of the channels into the number corresponding to the number of rows or columns (i.e., into the total 11 channels in the above-mentioned example). As a result, it is possible to effectively reduce the required number of the amplifiers (i.e., the amplifier 21a) included in each channel.

Further, in the second embodiment, it is not necessary to limit a manner of combination of the load detection parts 14 which are molded integrally, to the above-mentioned case in which each line (each row or each column) of those are integrally molded. That is, for example, a plurality of lines (rows or columns) thereof may be integrally molded. Furthermore, to the contrary, each row or each column may be divided into a plurality of groups, and each group of the load detection parts 14 may be integrally molded. Thus, various manners of combination of the load detection parts 14 may be applied for determining a group to be integrally molded. In such a case, a combination or grouping of the strain measurement patterns 15 which are connected together into a single continuous pattern should not be determined according to the manner of combination or grouping for integrally molding the load detection parts 14. Rather, it is possible to freely determine a combination or grouping of the strain measurement patterns 15 to be connected together into a single continuous pattern, separately from that for integrally molding the load detection parts 14.

That is, although the strain measurement patterns 15 are mutually connected into the single continuous pattern for the line of the load detection parts 14 which are integrally molded in the second embodiment as shown in FIG. 10A, it is not necessary to limit to this manner. Alternatively, for example, the strain measurement pattern 15 may be separately provided for each load detection part 14, and the bridge circuit may be provided for each load detection part 14, while the load detection parts 14 are integrally molded for each line. Thus, in this variant embodiment of the second embodiment, the load detection parts 14 are integrally manufactured for each row or each column, while the strain measurement pattern 15 is provided separately for each particular load detection part 14.

Similarly, as another variant embodiment of the second embodiment, among the plurality of load detection parts 14 in each row or each column (i.e., within the total ten load detection parts 14 in the example of FIG. 10A), the strain measurement patterns 15 may be connected together into a single continuous pattern for each predetermined number of the load detection parts 14 thereamong (for example, for each two). Thus, by appropriately adjusting the number of combination or grouping of the strain measurement patterns 15 to be mutually connected, it is possible to appropriately control a relationship of tradeoff between the required cost and the achievable measurement accuracy.

Thus, according to the embodiments of the present invention, a configuration is provided in which the measurement target object X is received by the respective load cells 12 via the plurality of separate collision tables 11. As a result, a load applied by the measurement target object X is prevented from acting as a moment to the load cell 12, and thus, it is possible to accurately measure the collision reaction force. Further, according to the embodiments of the present invention, the collision surface is divided finely into the many collision tables 11, and the load cell 12 is provided for each of the collision tables 11. As a result, only the load cells 12 belonging to the collision tables 11 against which the measurement target object X actually collides react approximately at the same time as that at which the actual collision occurs. As a result, it is possible to achieve accurate measurement without being affected by phase difference otherwise occurring due to necessary propagation time of measurement waveforms. Furthermore, since the many load cells 12 receive the measurement target object X, it is possible to draw a two-dimensional reaction force distribution with respect to the collision surface with the use of the measurement values of the respective load cells 12. As a result, it is possible to carry out evaluation in various view points.

Further, the present invention is not limited to the above-described embodiments, and variations and modifications may be made without departing from the basic concept of the present invention claimed below.

The present application is based on Japanese priority application No. 2004-280050, filed on Sep. 27, 2004, the entire contents of which are hereby incorporated herein by reference.

What is claimed is:

1. A collision reaction force measurement apparatus, comprising:

a collision surface maintainable in a stable position and receiving a collision of a portable electronic device thereon; and a measurement part measuring a collision reaction force occurring when the portable electronic device collides against the collision surface, wherein:

said collision surface comprises a plurality of collision surface elements, and said measurement part comprises a plurality of measurement part elements provided for the plurality of collision surface elements, respectively.

2. The collision reaction force measurement apparatus as claimed in claim 1, further comprising:

a display part displaying a distribution of collision reaction force values on the collision surface, measured by the respective ones of the plurality of measurement part elements, by varying a predetermined display attribute according to the measurement values output by the respective measurement part elements.

3. The collision reaction force measurement apparatus as claimed in claim 2, wherein:

the predetermined display attribute comprises a display color which is varied according to the respective measurement values of the measurement part elements, thereby to display the distribution of the measured collision reaction forces.

4. The collision reaction force measurement apparatus as claimed in claim 2, wherein:

the plurality of collision surface elements included in the collision surface are arranged like a grid; and the display part has a display arrangement also like a grid and corresponding to the grid-like arrangement of the plurality of collision surface elements.

5. The collision reaction force measurement apparatus as claimed in claim 1, wherein:

each of the plurality of measurement part elements comprises a load cell supporting a respective one of the plurality of collision surface elements; and each load cell has a pattern made of an electrically conductive material, and, as a result of strain of the pattern occurring due to the collision of the portable electronic device against the collision surface element, being measured, the collision reaction force concerning the collision surface element is measured.

6. The collision reaction force measurement apparatus as claimed in claim 5, wherein:

the load cell has a natural frequency value which is sufficiently higher than a frequency of a collision reaction force occurring when the portable electronic device collides against the collision surface element, such that resonance, otherwise occurring due to the collision of the portable electronic device, is avoided.

7. The collision reaction force measurement apparatus as claimed in claim 5, wherein:

the detection of strain of the pattern of the electric conducive material is carried out as a result of a change, in an electrical resistance of the pattern, occurring due to the strain thereof being measured.

8. The collision reaction force measurement apparatus as claimed in claim 1, wherein:

the plurality of collision surface elements are arranged like a grid;

a single electrically conductive strain measurement pattern is provided for each predetermined line of collision surface elements along a predetermined direction of the grid; and the collision reaction force is measured for each electrically conductive strain measurement pattern.

9. The collision reaction force measurement apparatus as claimed in claim 8, wherein:

each load cell is manufactured by etching working technology.

* * * * *